United States Patent
Wilson et al.

(10) Patent No.: US 11,236,635 B2
(45) Date of Patent: *Feb. 1, 2022

(54) GAS TURBINE ENGINE POWER SETTING

(71) Applicant: ROLLS-ROYCE plc, London (GB)

(72) Inventors: Matthew J Wilson, Derby (GB);
William Renold-Smith, Derby (GB)

(73) Assignee: ROLLS-ROYCE plc, London (GB)

( * ) Notice: Subject to any disclaimer, the term of this patent is extended or adjusted under 35 U.S.C. 154(b) by 108 days.

This patent is subject to a terminal disclaimer.

(21) Appl. No.: 16/423,461

(22) Filed: May 28, 2019

(65) Prior Publication Data
US 2020/0141267 A1 May 7, 2020

(30) Foreign Application Priority Data

Nov. 2, 2018 (GB) ..................................... 1817939

(51) Int. Cl.
*F02C 9/48* (2006.01)
*F01D 21/00* (2006.01)
(Continued)

(52) U.S. Cl.
CPC ............ *F01D 21/003* (2013.01); *F02C 3/113* (2013.01); *F02C 7/057* (2013.01); *F02C 9/48* (2013.01);
(Continued)

(58) Field of Classification Search
CPC ........ F01D 21/003; F01D 25/285; F02K 3/00; F02K 3/02; F02K 3/04; F02K 3/06;
(Continued)

(56) References Cited

U.S. PATENT DOCUMENTS

| 3,677,501 A | 7/1972 | Denning |
| 3,837,220 A | 9/1974 | McDonald et al. |

(Continued)

FOREIGN PATENT DOCUMENTS

| CN | 110043370 A | * | 7/2019 |
| EP | 1 327 750 A2 | | 7/2003 |

(Continued)

OTHER PUBLICATIONS

Chapman, Jeffryes W., Thomas M. Lavelle, and Jonathan S. Litt. "Practical techniques for modeling gas turbine engine performance." 52nd AIAA/SAE/ASEE joint propulsion conference. 2016 (Year: 2016).*

*Primary Examiner* — Herbert K Roberts
*Assistant Examiner* — Fatemeh Esfandiari Nia
(74) *Attorney, Agent, or Firm* — Oliff PLC

(57) ABSTRACT

A method of calibrating a gas turbine engine having a propulsive fan, and an engine core, the method including: measuring a total thrust generated by the engine; measuring the thrust generated by the engine core; measuring first and second engine performance parameters; based on the total thrust and engine core thrust, determining a thrust generated by the propulsive fan; providing a first power setting parameter associating the fan thrust with the first engine performance parameter; and providing a second power setting parameter associating the engine core thrust with the second engine performance parameter.

12 Claims, 6 Drawing Sheets

(51) Int. Cl.
*G01L 5/13* (2006.01)
*G01L 5/12* (2006.01)
*F02C 7/057* (2006.01)
*F02C 3/113* (2006.01)
*F02K 3/00* (2006.01)
*F02K 3/02* (2006.01)
*F02K 3/04* (2006.01)
*G01M 15/14* (2006.01)

(52) U.S. Cl.
CPC ............... *F02K 3/00* (2013.01); *F02K 3/02* (2013.01); *F02K 3/04* (2013.01); *G01L 5/12* (2013.01); *G01L 5/133* (2013.01); *G01M 15/14* (2013.01); *F05D 2260/83* (2013.01)

(58) Field of Classification Search
CPC .... F02C 9/00; F02C 9/48; F02C 7/057; F02C 3/113; G01L 5/12; G01L 5/133; G01M 15/14; F05D 2260/83; F05D 2260/12; Y02T 50/60
See application file for complete search history.

(56) References Cited

U.S. PATENT DOCUMENTS

| | | | | |
|---|---|---|---|---|
| 4,136,517 A * | 1/1979 | Brown | ..................... | F02C 9/28 60/223 |
| 4,242,864 A | 1/1981 | Cornett et al. | | |
| 4,258,545 A * | 3/1981 | Slater | ..................... | F02C 9/00 60/226.1 |
| 4,275,557 A * | 6/1981 | Marvin | ..................... | F02C 9/28 60/773 |
| 4,437,303 A | 3/1984 | Cantwell | | |
| 5,365,795 A * | 11/1994 | Brower, Jr. | ............ | G01F 1/363 73/861.63 |
| 5,760,706 A * | 6/1998 | Kiss | ..................... | H01Q 1/04 340/10.34 |
| 5,809,772 A * | 9/1998 | Giffin, III | ............ | F02K 3/075 60/226.1 |
| 6,487,490 B1 | 11/2002 | Kamath et al. | | |
| 6,679,098 B2 * | 1/2004 | Cardinale | ............ | G01N 1/24 73/23.2 |
| 7,861,578 B2 | 1/2011 | Adibhatla et al. | | |
| 8,720,306 B2 | 5/2014 | McCune et al. | | |
| 10,473,038 B2 * | 11/2019 | Morgan | ............ | F02C 9/58 |
| 2007/0276601 A1 * | 11/2007 | Parfitt | ............ | G01L 5/133 702/1 |
| 2008/0281483 A1 | 11/2008 | Litt | | |
| 2010/0250051 A1 | 9/2010 | Nestico et al. | | |
| 2014/0123625 A1 * | 5/2014 | Snell | ............ | F02C 9/28 60/204 |
| 2015/0114006 A1 * | 4/2015 | Tan | ............ | F01D 21/003 60/797 |
| 2015/0134270 A1 * | 5/2015 | Long | ............ | G01M 15/14 702/33 |
| 2016/0032740 A1 | 2/2016 | Niergarth et al. | | |
| 2016/0273379 A1 * | 9/2016 | Soares, Jr. | ............ | B64F 5/60 |
| 2018/0171816 A1 * | 6/2018 | Moniz | ............ | F01D 17/04 |
| 2019/0033160 A1 * | 1/2019 | Dittberner | ............ | G01N 27/04 |
| 2019/0145891 A1 * | 5/2019 | Waxman | ............ | G01J 3/0208 356/409 |
| 2020/0019128 A1 * | 1/2020 | Brooks | ............ | G05B 13/04 |

FOREIGN PATENT DOCUMENTS

| | | | | |
|---|---|---|---|---|
| GB | 1 023 304 A | | 3/1966 | |
| IT | 1110712 B | * | 1/1986 | ............... F02C 9/28 |
| JP | 2005105951 A | * | 4/2005 | |
| JP | 2005106016 A | * | 4/2005 | |
| JP | 2005113919 A | * | 4/2005 | ............ F02K 3/075 |

* cited by examiner

GAS TURBINE ENGINE POWER SETTING

The present disclosure relates to a method of calibrating a gas turbine engine, a method of calibrating an engine core and a fan, and an apparatus for measuring the thrust generated by an engine core of a gas turbine engine.

Gas turbine aircraft engines comprise a propulsive fan arranged downstream of an air intake. The fan is surrounded by a fan case, and typically generates two separate airflows. A first airflow is received by a core of the engine, and a second airflow is received in a bypass duct. The core comprises one or more compressors, a combustor, and one or more turbines. The bypass duct is defined around the core.

In use, the core airflow is compressed by the compressors, mixed with fuel and combusted in the combustor. The combustion products are expanded through the turbine stages and exhausted through a core nozzle. The turbines drive the compressor stages and propulsive fan through one or more interconnecting shafts.

Typically, whilst some thrust is provided by the exhaust of the combustion products though the core nozzle, the majority of the thrust generated by the engine is provided by the propulsive fan, through the bypass duct. In some examples, the core may provide 5% to 10% of the total thrust of the engine.

Propulsive efficiency of the gas turbine can be improved by increasing the bypass ratio (the ratio of the air mass flow through the bypass duct to the air mass flow through the core). The bypass ratio is related to the size of the fan which in turn is limited by the rotation speed of the fan, as a large fan rotating at high speed may experience unwanted distortion of the fan, and other effects.

If the fan is driven by a reduction gearbox, it can be driven at slower speeds than the shafts from the turbines. This enables the fan to be increased in size, facilitating an increase of the bypass duct ratio.

In flight, it is not possible to directly measure the thrust produced by a gas turbine engine. Therefore, prior to entering into service, gas turbine engines are calibrated to provide a correlation between a measurable parameter, such as rotation speed of one of the core shafts, to a known thrust output. Based on this, the thrust being produced by an engine can be determined. Typically, engines are calibrated as a single component. Therefore, when part of the engine needs to be serviced, overhauled or replaced or repaired, the whole engine must be taken out of use, and transported back to a maintenance location.

According to a first aspect there is provided a method of calibrating a gas turbine engine having a propulsive fan and an engine core, the method comprising: measuring a total thrust generated by the engine; measuring the thrust generated by the engine core; measuring first and second engine performance parameters; based on the total thrust and engine core thrust, determining a thrust generated by the propulsive fan; providing a first power setting parameter associating the fan thrust with the first engine performance parameter; and providing a second power setting parameter associating the engine core thrust with the second engine performance parameter.

The method provides for separate calibration of the fan and engine core, rather than calibration of the engine as a whole. Thus, when in use, the thrust produced by the engine core and the thrust produced by the fan can be calculated separately. This enables any fan to be used with any compatible engine core (also known as intermixing). The intermixing can be realised without having to incorporate a standard correction into the power setting parameter to account for variation in different levels of thrust being produced by different compatible components (for example due to manufacturing differences, or different wear and tear). Therefore, the method provides for a gas turbine engine that has the capability to intermix components, whilst still achieving high efficiency.

Measuring the engine core thrust may comprise: measuring a temperature and pressure at an entry of a core nozzle; and determining the engine core thrust generated based on the measured temperature and pressure.

The temperature and pressure may be measured by a test rig comprising the core nozzle. The core nozzle, referred to as a slave nozzle, has calibrated characteristics, allowing the core thrust to be determined from the measured parameters. The slave nozzle is part of the test rig, and is not part of the delivered engine. The slave nozzle can be used for calibrating many engines.

The test rig may further comprise: a nacelle arranged to receive the engine core and the propulsive fan. The nacelle may at least partially define a bypass duct around the nacelle and the engine core. The nacelle is also a slave component.

The test rig may be arranged to support the gas turbine engine, and may comprise load cells for measuring the total thrust generated by the engine.

Measuring the total thrust and engine core thrust may comprise: operating the engine at an output level; allowing the operation of the engine to stabilise; determining the first and second power setting parameter at the output level; and changing the output level and repeating the steps of allowing the operation of the engine to stabilise and determining the first and second power setting parameter at the output level.

The method may comprise outputting the first power setting parameter to a first data card associated with the fan; and outputting the second power setting parameter to a second data card associated with the engine core. The first and second data cards may be arranged to be coupled to an engine control unit of the assembled engine.

The use of data cards holding the power setting parameters enables the intermixing of engine components. Each core and fan has its own data card. By coupling the data card associated with a particular component to the engine control unit, the correct power setting parameter may be provided to the engine.

According to a second aspect, there is provided a method of calibrating an engine core and a fan of a gas turbine engine, the method comprising: measuring the total thrust generated by the engine; measuring the air flow through a nozzle coupled to the engine core, to determine the thrust generated by the core only; and determining the thrust generated by the fan based on the total thrust and the engine core thrust.

The method provides for separate calibration of the fan and engine core, rather than calibration of the engine as a whole. Thus, when in use, the thrust produced by the engine core and the thrust produced by the fan can be calculated separately. This enables any fan to be used with any compatible engine core (also known as intermixing). The intermixing can be realised without having to incorporate a standard correction into the power setting parameter to account for variation in different levels of thrust being produced by different compatible components (for example due to manufacturing differences, or different wear and tear). Therefore, the method provides for a gas turbine engine that has the capability to intermix components, whilst still achieving high efficiency.

In either the first aspect or the second aspect, the engine core may comprise a turbine, a compressor, a core shaft connecting the turbine to the compressor, and a gearbox that receives an input from the core shaft and outputs drive to the fan so as to drive the fan at a lower rotational speed than the core shaft. The fan comprises a plurality of fan blades.

According to a third aspect, there is provided an apparatus for measuring the thrust generated by an engine core of a gas turbine engine, the apparatus comprising: a nozzle arranged to attach to an exhaust end of an engine core; a pressure sensor in the nozzle arranged to measure the total pressure at an entry to the nozzle; and a temperature sensor in the nozzle arranged to measure the temperature at an entry to the nozzle, wherein the nozzle comprises a slave nozzle having a calibrated flow function characteristic.

The apparatus enables separate calibration of the fan and engine core, rather than calibration of the engine as a whole Thus, when in use, the thrust produced by the engine core and the thrust produced by the fan can be calculated separately. This enables any fan to be used with any compatible engine core (also known as intermixing). The intermixing can be realised without having to incorporate a standard correction into the power setting parameter to account for variation in different levels of thrust being produced by different compatible components (for example due to manufacturing differences, or different wear and tear). Therefore, the method provides for a gas turbine engine that has the capability to intermix components, whilst still achieving high efficiency.

The apparatus may further comprise a nacelle arranged to receive the engine core and propulsive fan, wherein the nacelle at least partially defines a bypass duct around the engine core; supports for mounting the nacelle; and load cells coupled to the supports to measure the total thrust generated by the engine.

According to a further aspect there is provided a method of calibrating an engine core of a gas turbine engine, wherein the engine core comprises a turbine, combustion equipment, a compressor, and a core shaft connecting the turbine to the compressor, the core shaft arranged to drive a propulsive fan of the gas turbine engine, the method comprising: providing a resistance load on the core shaft, the resistance load arranged to replicate the load of a propulsive fan; driving the engine core; measuring a performance parameter or the engine core; measuring a thrust generated by the engine core; and determining power rating data of the engine core, providing a correlation between the performance parameter and the thrust.

Fans and fan cases may be manufactured to sufficient tolerances such that calibrating only the engine core allows the thrust generated by the whole engine to be determined accurately in use, thus allowing for efficient use of the engine. Since only the engine core is required to go through the calibration process, the calibration method (also known as passing off) does not require assembly of the whole engine, and so the calibration process is simplified. Furthermore, each engine core is able to be used in a predictable manner with any fan and fan case, rather than only being usable in a predicable manner with the fan and fan case it is calibrated with. This enables intermixing of engine modules (such as a core module, a fan module and a fan case module). It is also easier to deliver the fan, fan case and engine core if they are manufactured and calibrated separately.

The resistance load may comprise one or more generators. The method may comprise: operating the generators to generate power whilst driving the engine core. By using a generator as the load to calibrate the engine, at least part of the energy used during the calibration process can be recovered. The method may comprise storing the power generated in a battery or other energy storage device. Alternative, the power may be provided to an external powernetwork, or for immediate use.

The resistance load or engine core may comprise a gearbox, arranged such that the resistance load is driven at constant speed as the rotational speed of the core shaft is varied. This allows different engines, which may have shafts rotating at different speeds, to be calibrated using the same method and apparatus whilst generating AC power at the same frequency.

The resistance load may comprise a variable resistance load. The method may comprise varying the resistance of the resistance load to simulate different flight conditions. The method may further comprise measuring the performance parameter and thrust at different loads, such that the power rating data provides the correlation between the performance parameter and the thrust for different loads.

The performance parameter may be selected from a list comprising: a torque on the shaft; a rotational speed of the shaft.

Driving the engine core may comprise driving the engine core at a first rotational speed. The method may comprise: measuring the performance parameter and the thrust at the first rotational speed.

The method may comprise driving engine core at a plurality of rotational speeds; and measuring the performance parameter and thrust at different rotational speeds, such that the power rating data provides the thrust as a function of the performance parameter.

The method may comprise mounting the engine core on a test apparatus. The test apparatus may comprise a frame for supporting the engine core, and a base for supporting the frame. The frame may be coupled to the base by an interface arranged to allow relative displacement of the frame and base. Measuring a thrust generated by the engine core may comprise: measuring a force exerted between the frame and the base; and determining a thrust based on the force.

The test apparatus may comprise a sensor arrangement for measuring the performance parameter. Alternatively, the sensor arrangement may be comprised in the engine core.

The method may calibrate an engine core only, without a propulsive fan or fan case attached to the engine core.

According to a further aspect, there is provided a method of operating a gas turbine engine, the gas turbine engine comprising an engine core calibrated according to the method of any preceding claim, the method of operating the gas turbine engine comprising: combining the calibrated core with a fan and fan case; receiving a target thrust; setting an engine control parameter; measuring a thrust generated by the engine based on the power rating data and a measured engine performance parameter; determining if the measured thrust is equal to the target thrust; and controlling the engine control parameter based on the determining.

The method allows for an engine core to be used with any fan and fan case, allowing intermixing of different engine parts, whilst still enabling the thrust provided by the engine to be calculated accurately, enabling efficient use of the engine.

According to a further aspect, there is provided a calibration system arranged to calibrate an engine core of a gas turbine engine, wherein the engine core comprises a turbine, combustion equipment, a compressor, and a core shaft connecting the turbine to the compressor, the core shaft arranged to drive a propulsive fan of the gas turbine engine, the system comprising: a frame for mounting the engine core; a base for supporting the frame, the frame mounted from the base by an interface arranged to allow relative displacement of the frame and base; a sensor arrangement arranged to measure a force exerted between the frame and the base; and a resistance load arranged to be coupled to the core shaft of the engine, the resistance load arranged to replicate the load of a propulsive fan.

Fans and fan cases may be manufactured to sufficient tolerances such that calibrating only the engine core allows the thrust generated by the whole engine to be determined accurately in use, thus allowing for efficient use of the engine. Since only the engine core is required to go through the calibration process, the system does not require assembly of the whole engine, and so the calibration process is simplified. Furthermore, each engine core is able to be used in a predictable manner with any fan and fan case, rather than only being usable in a predicable manner with the fan and fan case it is calibrated with. This enables intermixing of engine modules (such as a core module, a fan module and a fan case module). It is also easier to deliver the fan, fan case and engine core if they are manufactured and calibrated separately.

The system may further comprise a second sensor arrangement, arranged to measure a performance parameter of the engine core. The second sensor may be comprised within the engine core.

The resistance load may comprise one or more generators. The system may further comprise a storage device arranged to store the power generated by the one or more generators. The resistance load or engine core may comprise a gearbox, arranged such that the resistance load is driven at constant speed as the rotational speed of the core shaft is varied. The resistance load may comprise a variable resistance load.

The system may be arranged to calibrate an engine core without a propulsive fan or fan case attached to the engine core.

According to a further aspect there is provided a method of controlling a gas turbine engine having a propulsive fan and an engine core, the method including: measuring a first engine performance parameter indicative of the output of the fan; measuring a second engine performance parameter indicative of the output of the engine core; determining a thrust contribution generated by the fan based on a first power setting parameter and the first engine performance parameter; determining a thrust contribution generated by the engine core based on a second power setting parameter and the second engine performance parameter; determining the total thrust based on the fan thrust and core thrust; and controlling the engine based on the determined total thrust, wherein the total thrust comprises the fan thrust and the engine core thrust.

The method provides for separate determination of the thrust produced by the fan and the engine core, during use, rather than determining the output of the engine as a whole. This enables any fan to be used with any compatible engine core (also known as intermixing). The intermixing can be realised without having to incorporate a standard correction into the power setting parameter to account for variation in different levels of thrust being produced by different components (for example due to manufacturing differences, or different wear and tear). Therefore, the method provides a way of operating a gas turbine engine that has the capability to intermix components, whilst still achieving high efficiency.

Controlling the engine based on the determined total thrust may comprise: comparing the determined total thrust to a target thrust; and based on the comparison, setting an engine control parameter. The method may comprise iteratively repeating the steps of measuring the first and second engine performance parameters, determined the fan thrust and core thrust and total thrust, comparing the total thrust to the target thrust, and setting the engine control parameter, in order to reach the target thrust.

The method may further comprise receiving an input indicating the target thrust, and iteratively repeating the method to reach the target thrust in response to the received input. The engine control parameter may comprise one or more of: a flow of fuel provided to the engine core; and/or a geometric parameter of the engine. The geometric parameter of the engine may include a variable vane position or a bleed valve flow.

The method may further include: receiving the first power setting parameter from a data card associated with the fan; and receiving the second power setting parameter from a data card associated with the engine core.

The engine core comprises a first engine core, the data card associated with the engine core may comprises a first core data card, and the method may further include: replacing the first engine core with a second engine core, different to the first, and compatible with the fan; and replacing the first core data card with a second core data card, the first core data card providing the second power setting parameter of the first engine core, and the second core data card providing the second power setting parameter of the second engine core.

The fan may comprise a first fan, the data card associated with the fan may comprise a first fan data card, and the method may further include: replacing the first fan with a second fan, different to the first, and compatible with the engine core; and replacing the first fan data card with a second fan data card, the first fan data card providing the first power setting parameter of the first fan, and the second fan data card providing the first power setting parameter of the second fan.

The use of data cards holding the power setting parameters enables the intermixing of engine components. Each core and fan has its own data card. By using the data card associated with a particular component, the correct power setting parameter may be provided to the engine.

According to yet a further aspect, there is provided a gas turbine engine for an aircraft comprising: an engine core comprising a turbine, a compressor, and a core shaft connecting the turbine to the compressor; a fan comprising a plurality of fan blades; and an engine control unit arranged to: receive a first engine performance parameter; receive a second engine performance parameter; receive a first power setting parameter for determining the thrust produced by the fan based on the first engine performance parameter; receive a second power setting parameter for determining the thrust produced by the engine core based on the second engine performance parameter; determine the total thrust generated by the engine based on the fan thrust and the core thrust; and control the operation of the engine based on the determined total thrust.

The ability to, during use, separately determine the thrust produced by the fan and the engine the thrust produced by the core (rather than determining the output of the engine as a whole) enables any fan to be used with any compatible engine core (also known as intermixing). The intermixing can be realised without having to incorporate a standard correction into the power setting parameter to account for variation in different levels of thrust being produced by different components (for example due to manufacturing differences, or different wear and tear). Therefore, this provides a way of operating a gas turbine engine that has the capability to intermix components, whilst still achieving high efficiency.

The gas turbine engine may include a fan data card arranged to provide the first power setting parameter; and a core data card arranged to provide the second power setting parameter. The first and second data cards may be operatively coupled to the engine control unit.

The use of data cards holding the power setting parameters enables the intermixing of engine components. Each core and fan has its own data card. By using the data card associated with a particular component, the correct power setting parameter may be provided to the engine.

The engine core may be a first engine core, and the core data card may be a first core data card associated with the first engine core. The first engine core may be interchangeable with a second engine core, having a second core data card associated with the second engine core. The fan may be a first fan, and the fan data card may be a first fan data card associated with the first fan. The first fan may be interchangeable with a second fan, having a second fan data card associated with the second fan.

The gas turbine engine may further comprise: a gearbox that receives an input from the core shaft and outputs drive to the fan so as to drive the fan at a lower rotational speed than the core shaft.

In any of the above aspects, the first power setting parameter may correlate the first engine performance parameter to the fan thrust for a range of values of the first engine performance parameter.

In any of the above aspects, the first engine performance parameter may comprise a parameter selected from: rotational speed of a shaft driven by a turbine of the engine core, and arranged to drive rotation of the fan directly; rotational speed of a shaft driven by a turbine of the engine core, and arranged to drive rotation of the fan through a gearbox; rotational speed of a shaft driven by a turbine of the engine core, and arranged to drive a compressor of the engine core; an air pressure in the bypass duct; or a torque measurement of the fan.

In any of the above aspects, the second power setting parameter may correlate the second engine performance parameter to the engine core thrust for a range of values of the second engine performance parameter.

In any of the above aspects, the second engine performance parameter may comprise a parameter selected from: an air pressure or temperature at the entry or exit of the engine core; an air pressure or temperature at the entry or exit of the engine core as a function of one or more of altitude, speed/Mach number; or the ambient temperature in the form of the difference from the International Standard Atmosphere (ISA) temperature (DTAMB) as defined in international standard ISO 2533:1975, or a measurement of an air pressure or temperature at any stage of the engine core, alone or in combination.

In any of the above aspects, the turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In the above aspects, the engine core, fan and a fan case surrounding the fan can be assembled and disassembled in a modular manner. This makes shipping of engines with larger diameter fans and fan cases easier.

The above aspects discuss the intermixing of components of a gas turbine engine. Some components, such as the fan or the fan case, require less frequent maintenance and servicing. Furthermore, components such as the fan case may be large and difficult to ship. By having modular components that can be intermixed, smaller components, such as the core which requires more regular maintenance, can be swapped with a replacement, whilst the aircraft having the engine remains in use. The core can then be returned to the manufacturer, without having to ship the whole engine, and keep a particular core with a particular fan and fan case. Without intermixing, each fan only works with one particular engine core, even though other cores may be compatible. This is because it is not possible to accurately determine the thrust output of the engine. Therefore, the entire aircraft has to be taken out of use for servicing of the core engine, as the core only works with one particular fan case and fan.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above), For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor s provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches). 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed), The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$ s, 105 Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range bounded by any two of the values in the previous sentence (i.e. the values may form upper or lower bounds), for example in the range of from 80 Nkg$^{-1}$ s to 100 Nkg$^{-1}$ s, or 85 Nkg$^{-1}$ s to 95 Nkg$^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K. 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 4A:
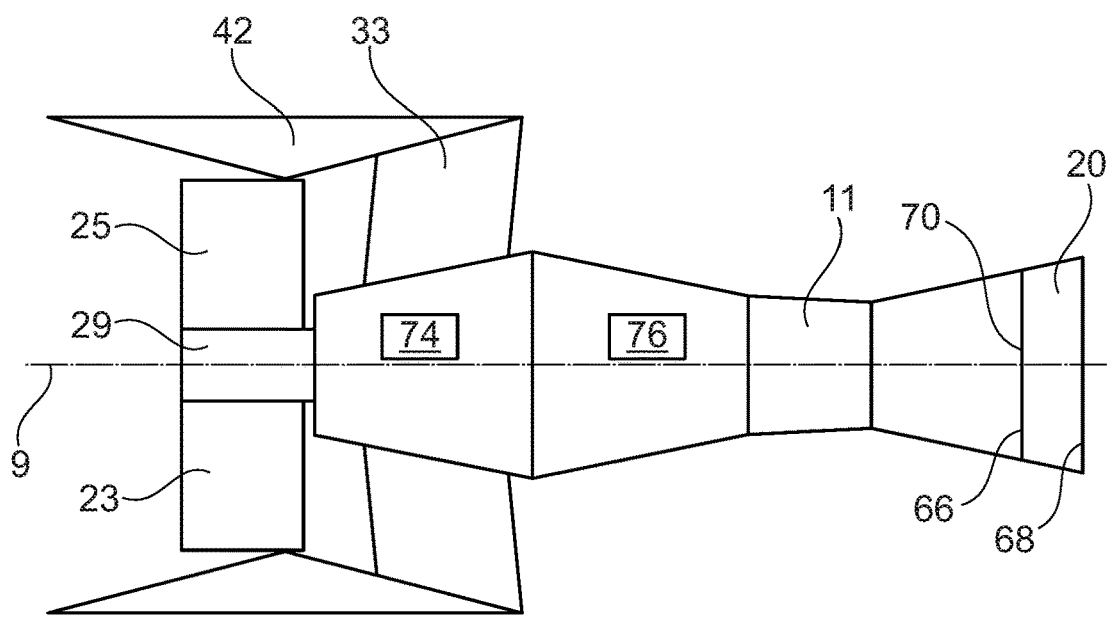
FIG. 4A illustrates a schematic view of the gas turbine engine of FIG. 1, illustrating the separate modules of the engine.
Figure 4B:
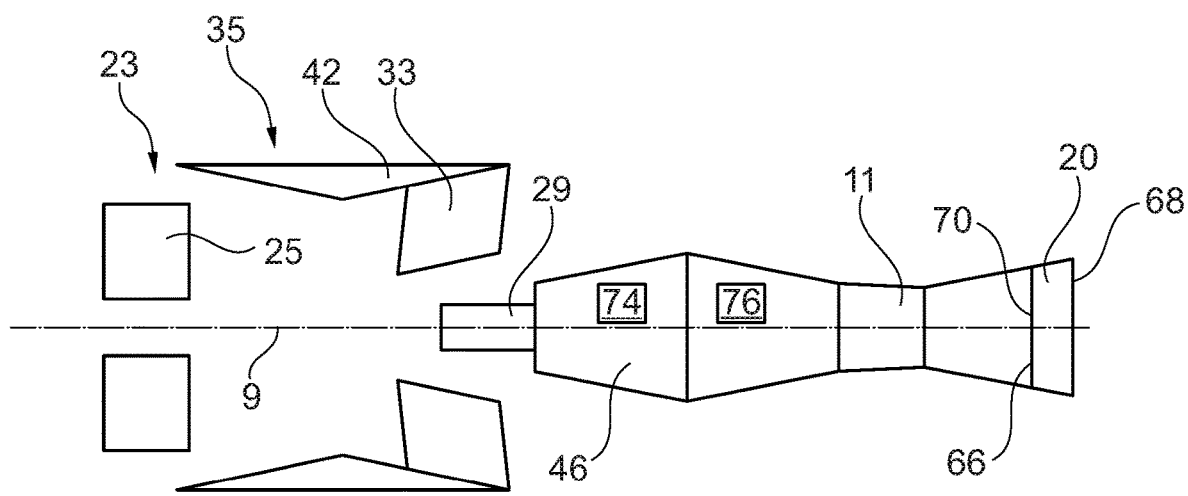
FIG. 4B illustrates the modules of FIG. 4A, in exploded form.
Figure 5:
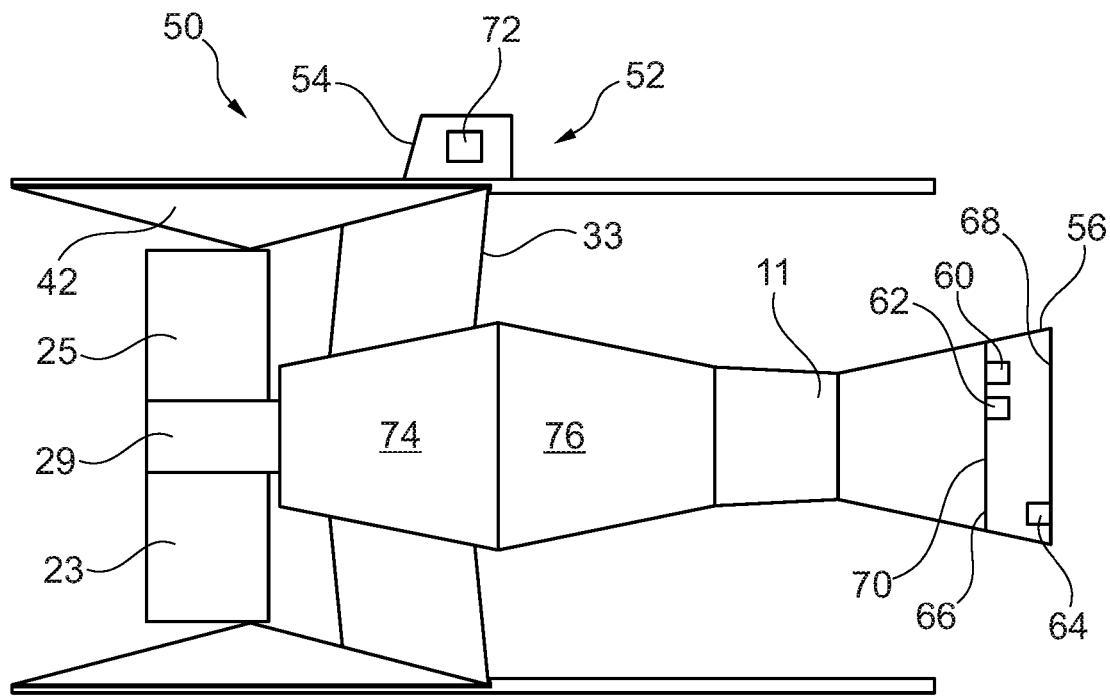
Figures 6A, 6B, 6C:
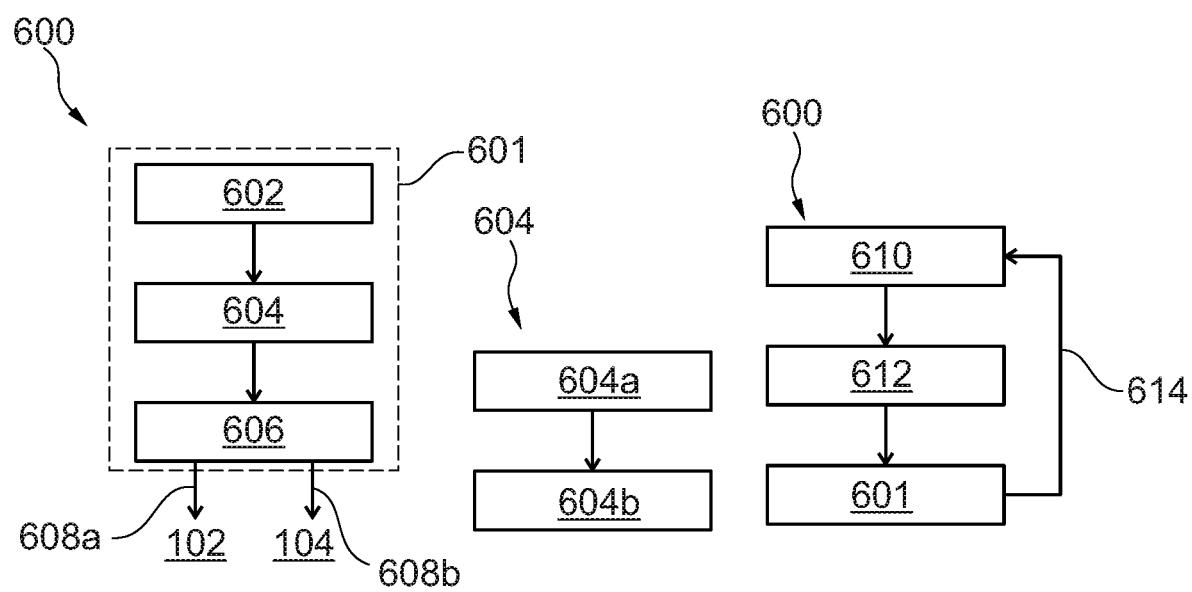
Figure 7:
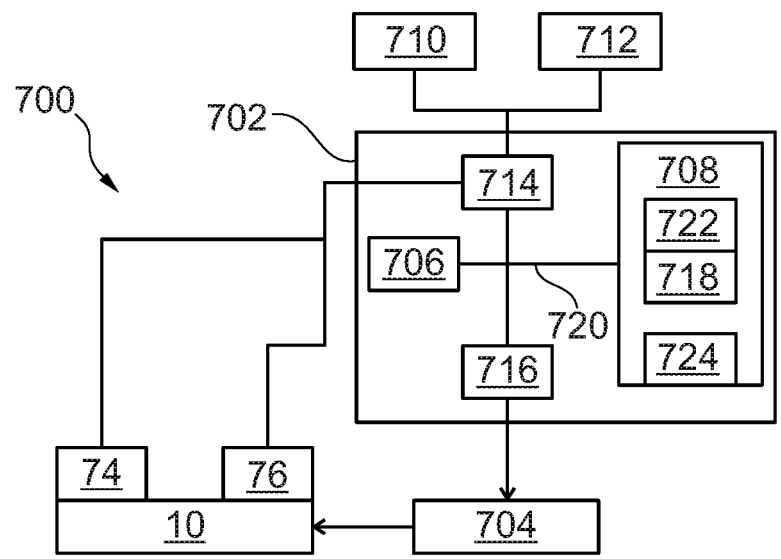
Figure 8A:
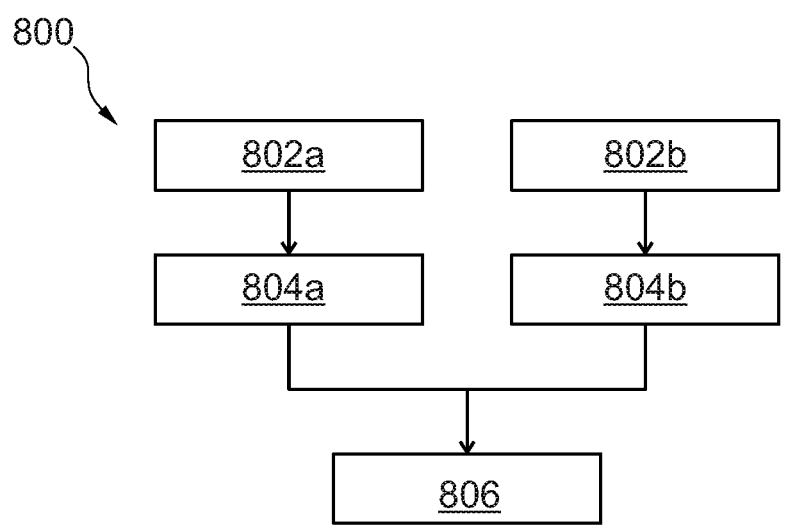
Figure 8B:
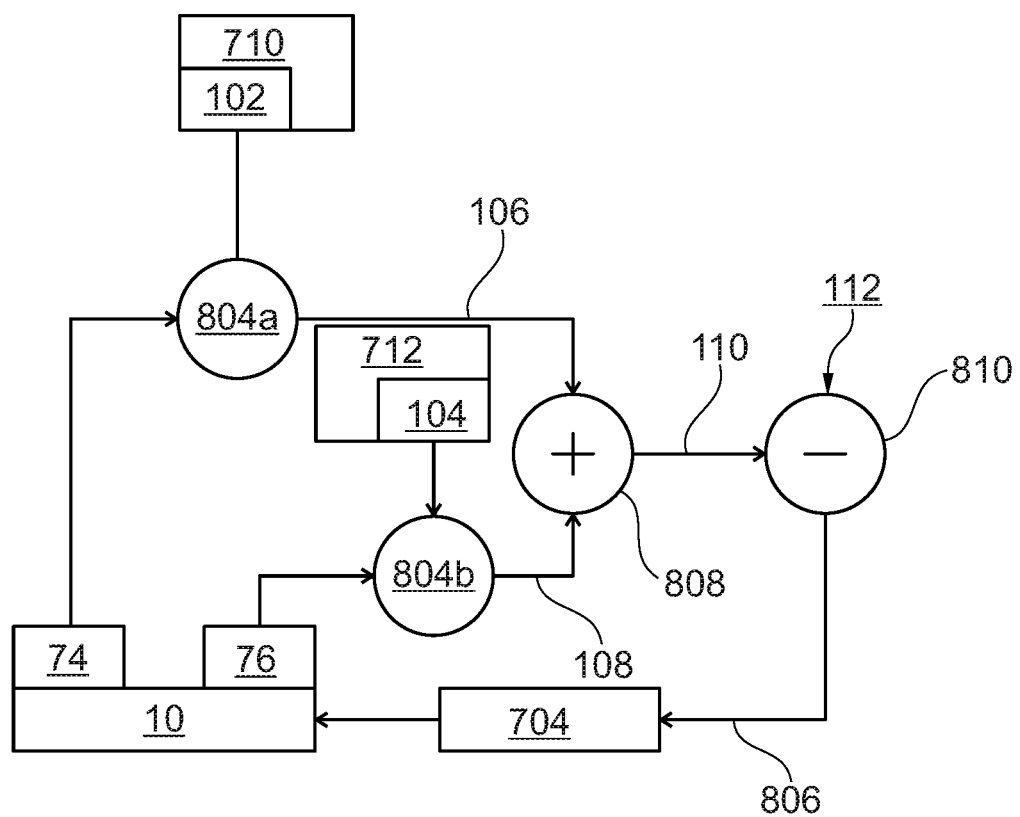

FIG. 5 schematically illustrates a system for calibrating the gas turbine engine of FIGS. 4A and 4B;

FIG. 6A illustrates a method of calibrating the gas turbine engine of FIGS. 4A and 4B;

FIG. 6B illustrates the step of determining the thrust generated by the engine core from the method of FIG. 6A;

FIG. 6C illustrates the method of FIG. 6A in further detail;

FIG. 7 schematically illustrates a system for controlling the operation of an engine;

FIG. 8A illustrates a method of controlling operation of a gas turbine engine; and FIG. 8B schematically illustrates the method of FIG. 8A.

Figure 1:
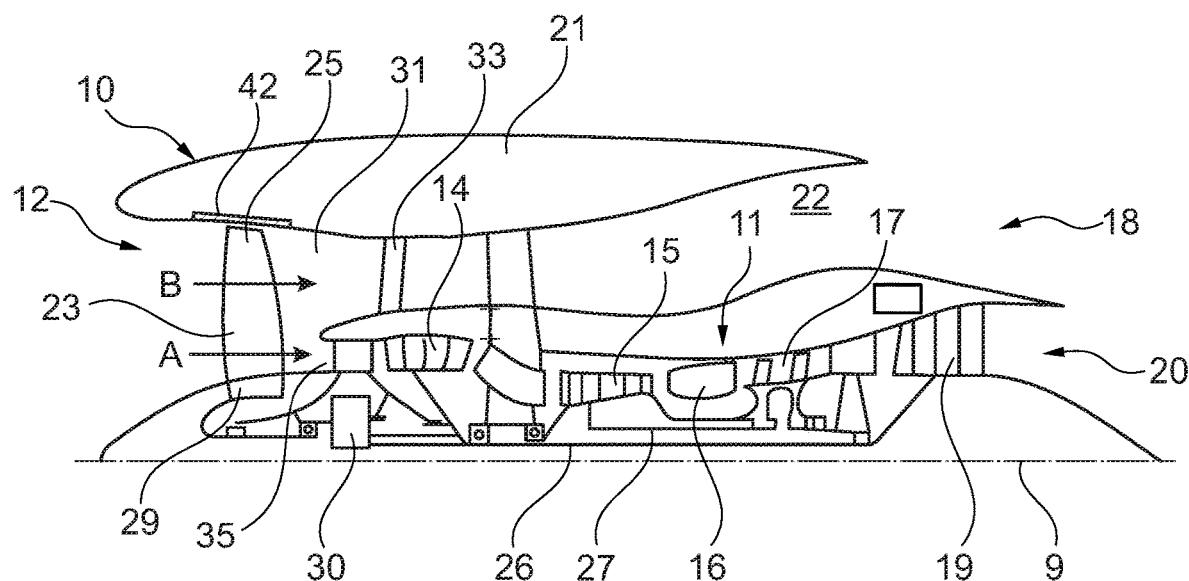
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. The nozzle 20 may be formed by a section of core housing attached to the downstream end 70 of the core air flow B. The fan 23 is attached to and driven by the low pressure turbine 19 via a shaft 26 and an epicyclic gearbox 30.

The propulsive fan 23 includes a plurality of fan blades 25 extending radially outward from a hub 29 mounted on an output shaft of the gearbox 30. The radially outer tips of the fan blades 25 are surrounded by a fan casing 42, which extends downstream behind the fan 23. The fan casing 42 will be discussed in more detail below, in relation to FIGS. 4A and 4B. Behind the fan casing 42, in the axial flow direction (downstream), a nacelle 21 surrounds the engine core 11. The fan casing 42 and nacelle 21 define a bypass duct 22 and a bypass exhaust nozzle 18 around the engine core 11.

The bypass airflow B flows through the bypass duct 22. At an upstream end of the bypass duct 22, adjacent an intake 31 of the bypass duct 22, and downstream of the fan 23, a plurality of outlet guide vanes 33 extend radially between the engine core 11 and the fan casing 42. The outlet guide vanes 33 reduce swirl and turbulence in the bypass airflow B, providing improved thrust.

In use, the core airflow A enters the core intake 35, and is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
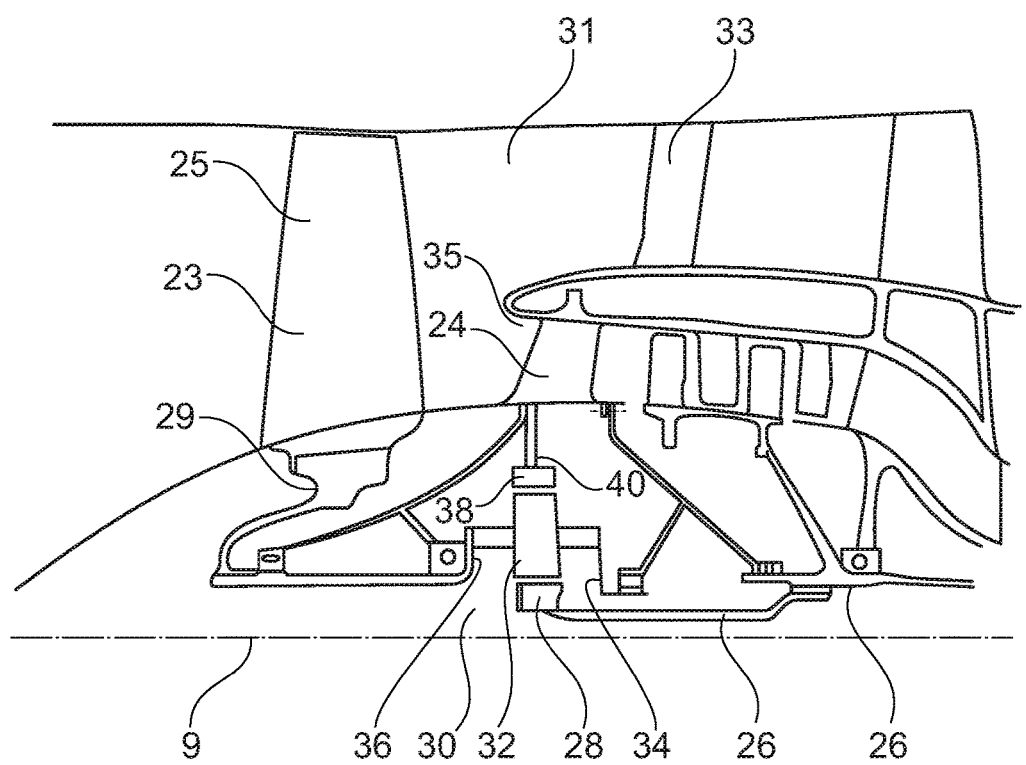
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
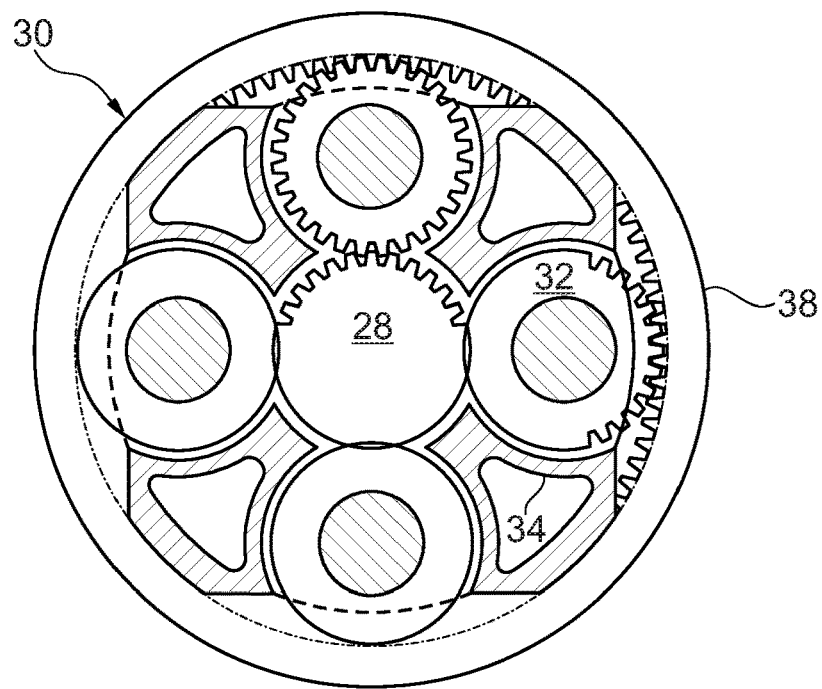
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example; any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the engine core nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. The gas turbine engine 10 may also be arranged in the "pusher" configuration, in which the fan 23 is located downstream of the core 11. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4A schematically illustrates the constituent components of the gas turbine engine 10 of FIGS. 1 to 3, with the nacelle 21 removed. As shown in FIG. 4B, the gas turbine engine 10 is formed of a number of separate modules 11, 23, 35. The engine 10 may thus be considered modular.

The first module is an engine core module 11. This typically includes the gearbox 30, low pressure compressor 14, high-pressure compressor 15, combustion equipment 16, high-pressure turbine 17, and low pressure turbine 19. The engine core module 11 can also be referred to as a propulsor. The second module, also referred to as the fan module 23, includes the fan blades 25. The third module 35 includes the fan case 42.

The outlet guide vanes 33 extend inwardly from the fan case 42, and form part of the fan case module 35. The hub 29 may be part of the fan module 46 or the engine core module 11. The gearbox 30 may additionally be configured as a separable module in its own right or part of the fan case module 35.

As shown in FIG. 4B, the fan module 46 can be removed from the engine core module 11, and the engine core module 11 and fan case module 35 can be separated from one another. This facilitates easy delivery and transport of the engine 10, as the separate modules 11, 23 35. Any suitable connections may be used to join the modules. For example, the fan case module 35 may be bolted to the engine core 11 by bolted connections at the radially inner ends of the outlet guide vanes 33. Further connecting/support struts may also be provided between the fan case 42 and the engine core 11.

The modules 11, 23, 35 may be interchangeable, such that, for example, the engine core module 11 of a gas turbine engine 10, may be replaced with a second, different, engine core module 11. The second engine core module 11 has the same design parameters (or sufficiently similar) so that it is compatible with the fan module 23 and fan case module 42. It will be appreciated that any one or more of the modules 11, 23, 35 may be interchanged with compatible alternatives in this way.

An operator of a fleet of aircraft or engines 10 may have a plurality of engine core modules 11, a plurality of fan modules 23 and a plurality of fan case modules 35. Each engine 10 may include any one of each of the modules, rather than each engine 10 comprising dedicated sets of modules that can only be used together (i.e. the first engine core module 11 only works with the first fan module 23 and the first fan case module 35, the second engine core module 11 only works with the second fan module 23 and the second fan case module 35, and the like). The interchangeability of modules allows the first engine core module 11 to be serviced, replaced or repaired, whilst aircraft using the engines 10 remain functional. Otherwise, an aircraft would have to be taken out of service for the engines 10 to be serviced.

The engine core module 11 is smaller than the fan case module 35, and also requires more regular maintenance. Therefore, by using a modular engine 10 with interchangeable modules, the smaller, easier to transport parts (such as the core module 11 and fan blades 25), can be shipped, whilst the larger parts (such as the nacelle 21 and fan case module 35), which are harder to transport, are kept with the aircraft.

In flight, it is not possible to measure the thrust generated by an engine 10 directly. When an engine 10 is manufactured, overhauled or serviced, it is calibrated to determine a correlation between one or more parameters that can be measured in flight, and the thrust. Thus, during operation, the measurable parameter is monitored, and the thrust output determined, based on the calibration.

In flight, when a target thrust is different to a determined thrust output, a control parameter of the engine 10 is changed based on the difference between the target thrust, and the determined thrust. The new thrust is then determined, and the process is repeated iteratively until the target thrust is achieved.

In one example, the measurable parameter may be, for example, the rotational speed of the core shaft 26 driving the gearbox 30, and the control parameter may be the rate at which fuel is delivered to the combustion equipment 16

The correlation between the measurable parameter and the thrust output may be referred to as a power setting parameter. A method 600 of determining a power setting parameter for a gas turbine engine 10 will now be discussed with reference to FIGS. 5 and 6A to 6C.

FIG. 5 shows an example of the gas turbine engine 10 shown in FIGS. 4A and 4B, and a rig 50 for determining two different power setting parameters 102, 104 for the engine 10.

The test rig includes a support system 52 for mounting the engine 10, to replicate the wing, or other mounting locations, of an aircraft. As such, the engine 10 is mounted from a pillar 54, through the nacelle 21.

As discussed above, the engine core 11 includes a core nozzle 20 formed at a downstream end of the core 11. The nozzle 20 is attached to a downstream end 70 of the final turbine stage of the core 11. When a gas turbine engine 10 is fitted to the test rig 50, a nozzle 56 that is part of the test rig 50 is used, rather than the nozzle 20 of the engine 10. Similarly, a nacelle 58 that is part of the test rig 50 is also used, rather than the nacelle 21 the engine 10.

The nozzle 56 and nacelle 58 are calibrated to allow accurate measurement of the thrust generated by the engine 10. The nozzle 56 and nacelle 58 are used for calibrating all engines 10, and are thus referred to as slave components. The slave components should have the same design as the nacelle 21 and nozzle 20 of the engine 10.

After calibration of the engine 10, the engine 10 may be used with any compatible nacelle 21 and core exhaust nozzle 20, as these components can be manufactured to such tolerances that the thrust output of the engine 10 is not affected by manufacturing variations or variations in wear and tear. Therefore, the only variations in thrust contributions are derived from different fans 23 and cores 11.

The slave nozzle 56 includes a pressure sensor 60 and a temperature sensor 62 at an entry 66 of the nozzle 56, at the upstream end of the nozzle 56. A further pressure sensor 64 is provided at the exit 68 of the nozzle 56. One or more load cells 72 are provided on the pillar 54 of the test rig 50.

In addition to the above sensors 60, 62, 72, the engine core module 11 also includes a number of other sensors or sensor systems 74, 76 to measure performance parameters of the engine core 11. These sensors 74, 76 are part of the engine 10 and are not slave components. Unlike the direct thrust measurements, the performance parameters may be measured during flight, as well as on the test rig 50. For example, a first sensor 74 may measure the rotation speed of the core shaft 26, whilst a second sensor system may provide for measurements of air pressure or temperature at the engine core intake 35 and exit 70.

When on the test rig 50, the gas turbine engine 10 is mounted from the salve nacelle 58 in the usual manner. For example, the fan case 42 may be secured to the nacelle 58. The engine core 11 is also secured to the fan case 42 through the outlet guide vanes 33. Further support struts (not shown) may be provided between the fan case 42 and/or nacelle 58 and the engine core 11. The slave nozzle 56 is also secured to the engine core 11 in the usual manner.

FIGS. 6A to 6C illustrate a method 600 of determining two different power setting parameters 102, 104 for a gas turbine engine 10 mounted to the rig 50.

The method 600 is carried out when the engine 10 is operating stably, at a first test output power level. The operation may be determined to be stable based on any of the sensor outputs. For example, stable operation may be achieved when the output of one or more of the sensors is stable (within a threshold variance) for a predetermined period of time. Alternatively, stable operation may simply be determined after passage of a fixed period of time.

At a first step 602, the total thrust 110 is measured through the load cells 72 in the pillar 54. At a second step 604, the thrust generated by the engine core 108 is measured, as will be described below. A first engine performance parameter, such as the rotation speed of the first core shaft 26, and a second engine performance parameter, such as the air pressure at core exit 70, are also measured.

The gross thrust generated by the engine core ($F_{C,G}$) is given by equation 1.

$$F_{C,G} = (W_n \times V_n \times Cv + (Ps_9 - P_{amb}) \times A_8 \times C_D) \quad (1)$$

$W_n$ is the flow through the core nozzle 56, $V_n$ is the velocity through the nozzle 56, $Ps_9$ is the static pressure at the exit 68 of the nozzle 56, $P_{amb}$ is ambient pressure, $A_8$ is the area of the entry 66 of the nozzle 56, and Cv and $C_D$ are constants associated with the design of the nozzle 56.

The drag caused by the inlet core engine 11 ($F_{C,D}$) is given by equation 2.

$$F_{C,D} = (W_1 \times V_0) \quad (2)$$

$W_1$ is the flow through the inlet of the core engine 11, and $V_0$ is the velocity of ambient air outside the engine.

The nett thrust of the core engine 11 ($F_{C,N}$) is given by equation 3.

$$F_{C,N}(F_{C,G} - F_{C,D}) \quad (3)$$

For an unchoked nozzle 56, (a nozzle for which the ratio $Ps_9/P_{amb} < 1.89$) $Ps_9 = P_{amb}$. Furthermore, on the test rig, the engine 10 is static, and so $V_0 \rightarrow 0$. Therefore, equation (3) may be simplified to:

$$F_{C,N} = (W_n \times V_n \times Cv) \quad (3')$$

By way of example, $W_n$ can be determined through the core flow method, or through the nozzle flow function characteristic. For example, the nozzle 56 may have a known (calibrated) flow function graph (describing $W\sqrt{T}/P$ as a function of nozzle pressure ratio $P_{entry}/P_{out}$) that allows the flow to be determined based on temperature and pressure measurements. Cv is known from the design of the slave nozzle 56. The velocity can then be calculated from Q curves once the flow function is known. Thus the core thrust 108 may be determined based on the ambient pressure, the pressure at the entry of the nozzle 56 and the temperature at the entry of the nozzle 56.

Therefore, determining the core thrust 108 may include 604a measuring the temperature and pressure at the entry of the nozzle 56 and 604b determining the core thrust 108 based on the measurements.

At a third step 606, the thrust contribution 106 from the fan 23 is determined. A gas turbine engine 10 has two source of thrust—the fan 23 and the engine core 11. Therefore, the thrust generated by the fan 106 is simply the difference between the total thrust 110 and the core thrust 108. The first step 602 and second step 604 may be carried out at the same time, or one after the other, provided the engine is still at the same test output power level.

At a final step 608a,b, two power setting parameters 102, 104 are output for the given test output power level. The first power setting parameter 102 describes the fan thrust 106 and first engine performance parameter at the first test output power level, whilst the second power setting parameter 104 describes the core thrust 108 and second engine performance parameter at the first test output power level.

As discussed above, the thrust contributions cannot be measured in flight. However, the engine performance parameters can be measured. Therefore, the power setting parameters 102, 104 allow the core thrust 108 and fan thrust 106 to be determined, and thus the total thrust 110 to be determined.

Determining the fan thrust 106 and core thrust 108 contributions independently means that for a modular gas turbine engine any fan module 23 may be used with any engine core module 11 and the total thrust 110 may be accurately calculated. Where a single power setting parameter is used, only the total thrust is calculated, and so the different contributions from the fan 23 and core 11 are not known. In order to accommodate this, the fan module 23 and engine core module 11 form a set that can only be used together, or the single power setting parameter can be set up to accommodate a wide variation in different modules, which results in reduced efficiency and operational life.

In use, an engine 10 will be operated at a range of power levels. Therefore, it can be useful for the power setting parameters 102, 104 to describe how the fan thrust 106 and core thrust 108 vary over a range of power levels.

FIG. 6C illustrates a method 600 for determining power setting parameters 102, 104 over a range of test output power levels. At a first step 610, the test output power level of the engine 10 is set. At a second step 612, the engine operation is allowed to stabilise, as discussed above. The power setting parameters at that output power level are then determined at a third step 601. This is in accordance with the steps discussed in relation to FIG. 6A. Finally, the test output power level of the engine 10 is changed, and the process repeated 614.

Thus, the method 600 provides a first power setting parameter 102 which provides the fan thrust as a function of the first engine performance parameter, and a second power setting parameter 104 which provides the core thrust 108 as a function of the second engine performance parameter.

The output power level of the engine may be controlled by any suitable engine control parameter or combination of engine control parameters. In one example, the engine control parameter may be the flow of fuel to the combustion equipment 16 of the engine 10. Low fuel flow provides low power, and high fuel flow provides high fuel power.

In other examples, the output level of the engine may be controlled by a variable geometric parameter of the engine, such as a variable vane position or a bleed valve flow and/or combinations of parameters.

The first power setting parameter 102 may be provided on a first data card 710, to be used in association with the fan module 23, whilst the second power setting parameter 104 is provided on a second data card 712 to be used in associate with the engine core module 11. The use of the data cards 710, 712 and the operation of the engine based on the operating parameter and power setting parameters 102, 104 will be discussed in more detail below, in relation to FIGS. 7, 8A and 8B.

FIGS. 7 and 8A schematically illustrate an engine control system 700 for operating the engine 10 and a method 800 of operating the engine 10. The system 700 comprises an engine control unit (ECU) 702 for managing operation of the engine 10.

It will be appreciated that the ECU 702 may be part of the engine 10, or may also be associated with an aircraft to which the engine 10 is fixed. Where the ECU 702 is part of the aircraft, it may control the operation of one or more gas turbine engines 10. However, in the below, the operation of a single engine 10 will be discussed.

When the engine 10 is installed onto an aircraft, the first and second data cards 710, 712 are connected to the ECU 702. This may be by any suitable data connection such as a wired or wireless connection.

The engine 10 is operated at a first operational power level. As discussed above, the operation of the engine 10 can be controlled by a number of different engine control parameters. FIG. 7 illustrates the example where the engine control parameter is fuel supply. In this example, the ECU 702 controls a fuel management unit (FMU) 704 to control the supply of fuel to the engine 10, thus controlling the power output of the engine 10.

At a first step, the ECU measures 802*a* the first engine performance parameter and measures 802*b* the second engine performance parameter, at the first operational power level.

The first and second engine performance parameters are provided to the ECU 702. At a second step, the ECU 702 uses the first power setting parameter 102 and the first engine performance parameter (taken form the first data card 710) to determine 804*a* the thrust generated by the fan 106. The ECU 702 similarly uses the second power setting parameter 104 and the second engine performance parameter (taken from the second data card 712) to determine 804*b* the thrust generated by the core 108.

Based on the fan thrust 106 and the core thrust 108, the ECU 702 determines the total thrust 110 being generated by the engine 10 at the current operational power level.

Using this method, the engine control parameter can be iteratively modified to achieve a target thrust 112. The target thrust may be determined by the ECU 702, or input by a pilot of the aircraft, or received by any other suitable method. FIG. 8B illustrates a closed loop system for iteratively achieving the target thrust.

Based on the target thrust 112, an initial value for the engine control parameter is determined, and then set through the FMU 704, This then causes engine 10 to operate at an initial operational power level.

The initial value for the engine control parameter may be determined by any suitable method. Due to manufacturing differences and wear and tear, each engine 10 made to the same design parameters may produce slightly different thrust for a given engine control parameter. The initial value may be based on an average engine, or a model engine.

As discussed above, the ECU 702 determines the fan thrust 106 at step 804*a* and the core thrust 108 at step 804*b* at the initial operational power level. At step 808 the total thrust 110 at the initial operational power level is determined as the sum of the fan thrust 106 and the core thrust 108. The difference between the total thrust 110 and the target thrust 112 is determined at a further step 810.

Based on the difference between the total thrust 110 and the target thrust 112, the engine control parameter is modified to control the engine in step 806. Depending on whether the total determined thrust 110 is greater than or smaller than the target thrust 112, the engine control parameter may be incrementally increased or decreased to set a new engine control parameter, to provide a new operational power level. After the power has stabilised at the new operational power level (typically of the order of milliseconds), the process is repeated. This process is iterated until there is no difference between the total thrust 110 and the target thrust 112.

The process can be used at any stage in operation of an engine 10. For example, it may be used when a change in thrust is required, for example for take-off, landing or changing altitude. It may also be used to maintain a constant thrust level during cruising; where ambient conditions change, resulting in small changes in power output to maintain constant thrust.

As discussed above, the two contributions to the thrust of an engine 10 are the fan thrust 106 and the core thrust 108. By calculating the separate contributions to the total thrust 110, any engine core module 11 can be used with any fan module 23. This is not the case when the total thrust of the engine 10 is determined from a single power setting parameter, as the separate contribution of each module 11,23 is not known.

Therefore, for example, when the engine core module 11 requires servicing, it can simply be swapped out for a different engine core module 11 of compatible design, and the total thrust of the core engine 11 can still be accurately know, allowing continuous efficient operation of the engine 10. This reduces downtime for an aircraft, since the whole engine 10 does not need to be taken out of use to only service the core module 11.

Furthermore, the core module 11 is small and compact and easy to transport. For a geared engine 10 as discussed above, the diameter of the fan case 42 may be over 90 inches (around 2.286 metres), or even over 130 inches (around 3.302 metres). This can make the fan case difficult to transport. Since the fan case 42, which requires significantly less maintenance and overhaul than the engine core module 11, can be used with any compatible engine core module 11, it does not have to be removed as regularly, making operation of a fleet of engines 10/aircraft more simple.

When the core module 11 or fan module 23 of an engine 10 is changed, the corresponding data card 710, 712 is simply changed. Therefore, each data card 710, 712, is associated with the fan module 23 or core module 11 for which it carries the power setting parameter 102, 104. As discussed above, an operator of a fleet of aircraft or engine 10 may have a set of engine core modules 11, and a set of fans modules 23. Each of these components may have a dedicated data card 710, 712.

As shown in FIG. 7, the ECU 702 includes a processing unit 706, a memory 708, a communications interface 714, and system drivers 716, connected to each other via a system bus 720. The memory 708 is subdivided into program storage 722 and data storage 724.

The communications interface 714 may include any suitable wired and/or wireless communications interface, and may enable communications via a number of different methods. For example, the target thrust 112 may be received over the communications interface 714, as well as the output from the sensors 74, 76 measuring the engine performance parameters. In addition the communications interface may transmit data regarding the engine 10 for display to the pilot of the aircraft or for other monitoring.

The system driver 716 may control operation of the FMU 704, as shown in FIG. 7. The system driver may include other drivers to control operation of the engine, if required. Furthermore, the system driver may include display drivers to provide an alternative route for outputting data regarding the engine 10.

In the example shown, the data cards 710, 712 are coupled to the processing unit 706 via the communications interface 714. The processing unit 706 can access the data cards 710, 712 via the system bus 720 and, if necessary, communications interface 714, to access the power setting parameters 102, 104.

The program storage 722 includes program code 718 that instructs the processing unit 706 to perform the steps of the method 800 of operating the engine discussed above.

It will be appreciated that although reference is made to a memory 708 it is possible that the memory 708 could be provided by a variety of devices. For example, the memory may be provided by a cache memory, a RAM memory, a local mass storage device such as the hard disk, any of these connected to the ECU 702 over a network connection. The processing unit 706 can access the memory 708 via the system bus 720 and, if necessary, communications interface 714, to access program code to instruct it what steps to perform. The program code may be delivered to memory 708 in any suitable manner. For example, the program code may be installed on the device from a CDROM; a DVD ROM/RAM (including −R/−RW or +R/+RW); a separate hard drive; a memory (including a USB drive; an SD card; a compact flash card or the like); a transmitted signal (including an Internet download, ftp file transfer of the like); a wire; etc.

It will be appreciated that the methods and systems discussed above for measuring the fan thrust 106, core thrust 108 and total thrust 110 during calibration of the engine 10 are given by way of example only. Any suitable method may be used for determining the two thrust contributions 106, 108.

In the above example, the first power setting parameter 102 provides the fan thrust 106 as a function of the rotation speed of the core shaft 26 driving the gearbox 30. However, it will be appreciated that any suitable engine performance parameter that is indicative of the performance of the fan 23 may be used instead of the shaft rotational speed. For example where the engine 10 includes multiple shafts 26, 27, the engine performance parameter for the core thrust 106 may be the rotational speed of any one of the shafts 26, 27. In an ungeared turbine engine 10, the performance parameter may also be based on the rotation speed of one or more shafts in the engine. The first engine parameter may also be an air pressure measured in the bypass duct 22 (at any point along the length of the duct 22), or a torque measurement on the fan 23.

Similarly, in the above example, the second power setting parameter 104 provides the core thrust 108 as a function of the air pressure at an exhaust 70 of the engine core 11. Again, it will be appreciated that any suitable engine performance parameter that is indicative of the performance of the core may be used, alone or in combination with other parameters. For example the engine performance parameter may be an air pressure or air temperature at an intake 35 of the engine core or an exhaust 70 of the engine core 11. The air pressure or temperature may be measured as a function of altitude, speed/Mach number; or the ambient temperature in the form of the difference from the ISA temperature (DTAMB). Alternatively, a pressure or temperature measurement at any point in the engine core 11 may be used. For example, the engine performance parameter may be a pressure or temperature ratio at a compressor stage 14, 15 of the engine 10 and a turbine stage 17, 19.

In the above examples, the fuel supply is used as an engine control parameter, to modify the power output of the engine 10. However, it will be appreciated that any suitable engine control parameter may be used. Furthermore, the engine 10 may be controlled by two or more parameters in combination, rather than a single parameter.

The power setting parameters may be provided on any suitable data carrier. The data cards 710, 712 discussed above are just given by way of example only. The data carrier may comprise any suitable memory device. The data carrier 710, 712 may be provided as a separate item, that can be removably connected to a port, for example in the cockpit of the aircraft, or any other suitable location.

In some examples, the power setting parameters 102, 104 may be transferred from the data carriers 710, 712 to the data storage 724 in the memory of the ECU 702. In such examples, the processing unit 706 may access the power setting parameters 102, 104 from the data storage 724, rather than the data carriers 710, 712.

As with the program code, the power setting parameters 102, 104 may be delivered to memory 708 in any suitable manner. For example, the program code may be installed on the device from a CDROM; a DVD ROM/RAM (including −R/−RW or +R/+RW); a separate hard drive; a memory (including a USB drive; an SD card; a compact flash card or the like); a transmitted signal (including an Internet download, ftp file transfer of the like); a wire; etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of calibrating a gas turbine engine having a propulsive fan, and an engine core, the method comprising:
measuring a total thrust generated by the engine;
determining a thrust generated by the engine core;
measuring first and second engine performance parameters;
based on the total thrust and the thrust generated by the engine core, determining a thrust generated by the propulsive fan;
providing a first power setting parameter associating the thrust generated by the fan with the first engine performance parameter; and
providing a second power setting parameter associating the thrust generated by the engine core with the second engine performance parameter,
wherein the first power setting parameter and the second power setting parameter provide the thrust generated by the fan and the thrust generated by the engine core as functions of the first engine performance parameter and the second engine performance parameter, respectively.

2. The method of claim 1, wherein determining the thrust generated by the engine core comprises:
measuring a temperature and pressure at an entry of a core nozzle; and
determining the thrust generated by the engine core based on the measured temperature and pressure.

3. The method of claim 2, wherein the temperature and pressure are measured by a test rig comprising the core nozzle.

4. The method of claim 3, wherein the test rig further comprises: a nacelle arranged to receive the engine core and the propulsive fan, wherein the nacelle at least partially defines a bypass duct around the engine core.

5. The method of claim 3, wherein the test rig is arranged to support the gas turbine engine and comprises load cells for measuring the total thrust generated by the engine.

6. The method of claim 1 wherein:
the first power setting parameter correlates the first engine performance parameter to the thrust generated by the fan for a range of values of the first engine performance parameter; and
the second power setting parameter correlates the second engine performance parameter to the thrust generated by the engine core for a range of values of the second engine performance parameter.

7. The method of claim 6, wherein measuring the total thrust and determining the thrust generated by the engine core comprises:
operating the engine at an output level;
allowing the operation of the engine to stabilise;
determining the first power setting parameter and the second power setting parameter at the output level; and
changing the output level and repeating the steps of allowing the operation of the engine to stabilise and determining the first power setting parameter and the second power setting parameter at the output level.

8. The method of claim 1, wherein the first engine performance parameter comprises a parameter selected from:
- rotational speed of a shaft driven by a turbine of the engine core, and arranged to drive rotation of the fan directly;
- rotational speed of a shaft driven by a turbine of the engine core, and arranged to drive rotation of the fan through a gearbox;
- rotational speed of a shaft driven by a turbine of the engine core, and arranged to drive a compressor of the engine core;
- an air pressure in a bypass duct; or
- a torque measurement of the fan.

9. The method of claim 1, wherein the second engine performance parameter comprises a parameter selected from:
- an air pressure or temperature at an entry or exit of the engine core;
- an air pressure or temperature at the entry or exit of the engine core as a function of one or more of altitude, speed/Mach number, or an ambient temperature in a form of a difference from International Standard Atmosphere (ISA) temperature; or
- a measurement of an air pressure or temperature at any stage of the engine core.

10. The method of claim 1, further comprising:
outputting the first power setting parameter to a first data card associated with the fan; and
outputting the second power setting parameter to a second data card associated with the engine core,
wherein the first and second data cards are arranged to be coupled to an engine control unit of the engine.

11. The method of claim 1, wherein:
the engine core comprises a turbine, a compressor, a core shaft connecting the turbine to the compressor, and a gearbox that is configured to receive an input from the core shaft, and output drive to the fan so as to drive the fan at a lower rotational speed than the core shaft; and
the fan comprises a plurality of fan blades.

12. The method of claim 11, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, the second compressor, and the second core shaft are arranged to rotate at a higher rotational speed than the first core shaft.

* * * * *